United States Patent [19]

Riedel et al.

[11] Patent Number: 5,071,335
[45] Date of Patent: Dec. 10, 1991

[54] APPARATUS FOR TWO-LAYERED INJECTION MOULDING

[75] Inventors: Gerd Riedel, Munich; Gottfried Lutz, Seefeld; Rudolf Breuer, Munich; Franz Gumplinger, Rottenburg, all of Fed. Rep. of Germany

[73] Assignee: Agfa Gevaert Aktiengesellschaft, Leverkusen, Fed. Rep. of Germany

[21] Appl. No.: 581,006

[22] Filed: Sep. 12, 1990

[30] Foreign Application Priority Data

Sep. 26, 1989 [DE] Fed. Rep. of Germany ....... 3932016

[51] Int. Cl.⁵ .............................. B29C 45/16
[52] U.S. Cl. ................... 425/130; 264/328.7; 264/328.8; 425/577; 425/DIG. 5
[58] Field of Search ................ 425/130, 577, DIG. 5; 264/328.8, 328.7, 328.11, 328.12

[56] References Cited

U.S. PATENT DOCUMENTS

| | | | |
|---|---|---|---|
| 4,650,601 | 3/1987 | Brunner et al. | 252/301.35 |
| 4,726,758 | 2/1988 | Sekine et al. | 264/245 |
| 4,801,068 | 1/1989 | Graczoll et al. | 249/78 |
| 4,803,031 | 2/1989 | Ochs et al. | 264/255 |
| 4,832,254 | 5/1989 | Peuke et al. | 249/79 |
| 4,840,760 | 6/1989 | Oishi | 264/245 |
| 4,867,672 | 9/1989 | Sorensen | 264/328.8 |

FOREIGN PATENT DOCUMENTS

| | | |
|---|---|---|
| 01522693 | 8/1985 | European Pat. Off. . |
| 0262490 | 4/1988 | European Pat. Off. . |
| 3739122 | 6/1989 | Fed. Rep. of Germany . |
| 2572676 | 3/1986 | France . |
| 2203984 | 11/1988 | United Kingdom . |

*Primary Examiner*—Timothy Heitbrink
*Attorney, Agent, or Firm*—Connolly & Hutz

[57] ABSTRACT

In an injection moulding tool for the production of a magnetic tape cassette casing constructed, in part, in two layers the apparatus has a fixed core (1a) provided, on the rim, with a projection (5) which provides a sealing strip relative to the moving core (2a). After the injection moulding process into the first mould cavity (4), the moving core (2a) is moved axially downwards by about half the wall thickness, whereupon the second mould cavity (3, 3') is filled by injection through a second needle shut-off nozzle (FIG. 1b).

2 Claims, 2 Drawing Sheets

APPARATUS FOR TWO-LAYERED INJECTION MOULDING

BACKGROUND OF THE INVENTION

The invention relates to an apparatus for injection moulding of an injection moulded object forming two partial layers from two at least partially overlapping components, in particular a magnetic tape cassette casing in a cavity of an injection moulding mould formed by a fixed mould half (1) and a moving mould half (2) with a moving core (2a) for the two components (3, 4), wherein a projection (5) on one of the mould halves limits one of the partial cavities.

Nowadays, multi-component injection moulding is a process frequently employed for the production of plastics mouldings such as multi-coloured car rear lights, bumpers for motor vehicles or hollow bodies. The different methods employed are described in the publications "Rationalisieren durch Mehrkomponenten-Spritzgiessen" (Journal "Kunststoffe", 78, (1988), pages 665 to 669 and an article about multicoloured injection moulding in the journal 'Plastikverarbeiter" 39, (1988), pages 148–152).

An apparatus with several mould jaws which can be displaced transversely to the tool axis is known from DE-GM 85 02 378, in which a projection on one of the mould jaws penetrates into the cavity and thus provides a separating line for the two components during production thereof. This apparatus can be used for three-dimensional shaped articles such as bumpers, but not for flat shapes such as magnetic tape cassette casings. Furthermore, injection moulding apparatuses are known in which the nozzle-side as well as the ejector-side core are moved in the direction of the tool axis. These apparatuses entail a complicated tool construction for production of magnetic tape cassette casings and do not allow the use of needle shut-off nozzles with direct feed orifice.

EP 0 152 693 describes an apparatus for producing a magnetic tape cassette casing, in which adjacent, transparent and opaque casing parts are produced by successive injection moulding by means of an axially displaceable mould jaw having a notched rim. U.S. Pat. No. 4,726,758 describes a corresponding apparatus for the same purpose, in which a projection in the axially displaceable moving mould half engages in a corresponding recess in the fixed mould half. EP 0 248 106 discloses an injection moulding apparatus for the production of mouldings from three different plastics components, in which a sliding control means controls the supply of the different components.

SUMMARY OF THE INVENTION

During the production of multi-layered casings for magnetic tape cassettes, in particular, special measures have to be taken in the injection moulding tool for achieving given mechanical properties, such as reduced tendency to vibrate and good connection between the various layers, as well as a pleasant appearance if, for example, the viewing window known from the state of the art and the opaque cassette casing are to be produced in a partially overlapping manner by double injection moulding.

Accordingly the object was to find an injection moulding apparatus of the above-mentioned generic type in which a better connection between the two components of the injection moulded object is achieved, with which good mechanical properties as well as a pleasant appearance are achieved and wherein the apparatus is simple in construction and allows the use of needle shut-off nozzles.

According to the invention, the object has been achieved with an apparatus having features as follows: a fixed core in a first moulding half has an axially positioned lower surface on which is formed an encircling projection laterally outward of the core axis. A moving core in a second moulding half has an axially positioned upper surface against which the projection forms a sealing strip. The moving core is movable between a first positions abutting against the projection on the fixed core and forming a first cavity and a second position spaced from the projection and forming a second cavity. Injection means injects material into the respective cavities to form two components which partially overlap. The moving core is axially displaceable in accordance with the ratio of layer thickness of the layers. Further details of the invention are given in the drawings and the description. The invention is described in more detail hereinafter with reference to the drawings.

DETAILED DESCRIPTION OF THE PREFERRED EMBODIMENTS

Figure 1A:
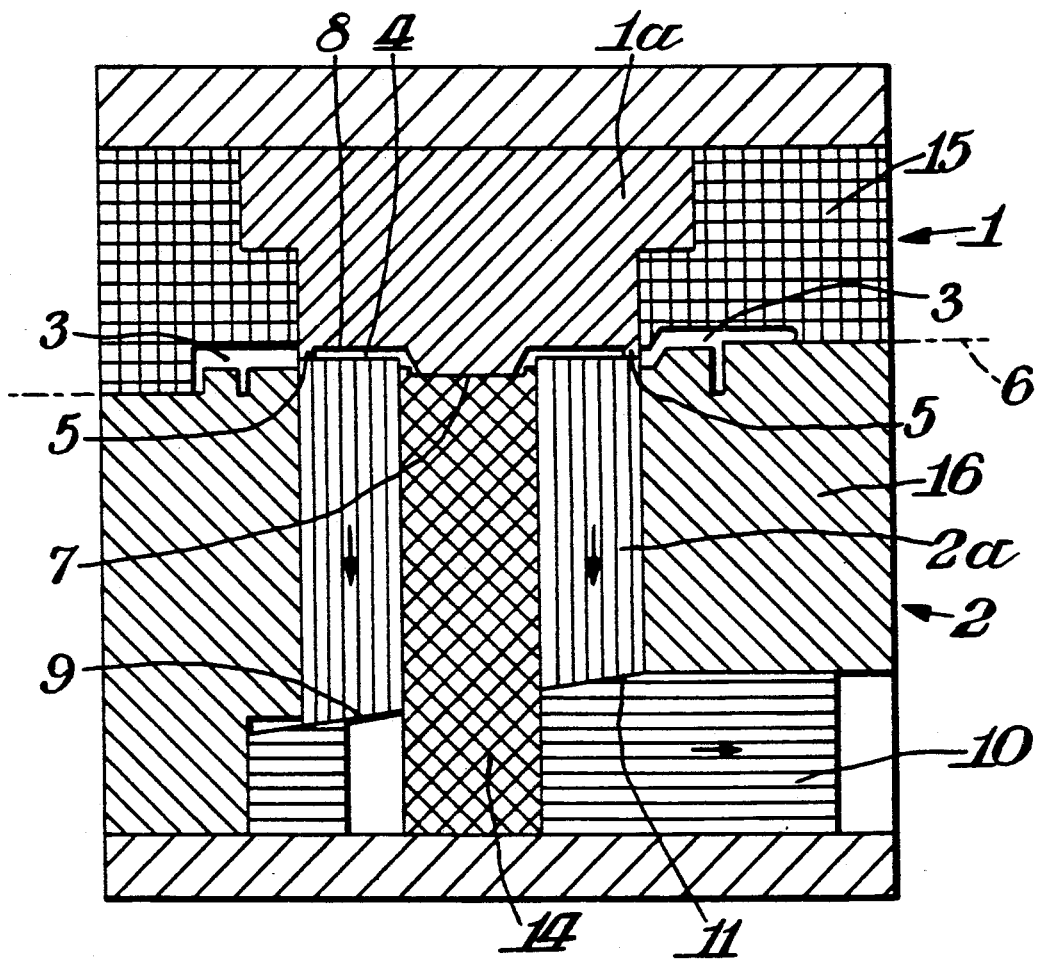
FIG. 1a shows a cross section through an apparatus according to the invention in which the moving core is in the upper working point.

The injection moulding tool according to the invention (FIG. 1a) consists of a fixed core (1a) in the fixed mould half (1) and a moving mould half (2) with a moving core (2a) and a fixed core (14). The cores are fitted into the mould inserts (15, 16). The mould cavity (3, 4), which provides for a partially overlapping two-layered structure of the two components of the moulding in this case, is located in the separating plane (6) between the two mould halves. In the separating plane (6), the tool is separated after the moulding compositions have cooled, and an ejector (not shown) allows removal of the moulding (17) (FIG. 2b) or a gripper (also not shown) takes off the moulding.

The injection moulding tool is preferably constructed in the manner described in U.S. Pat. No. 4,801,088: Furthermore; several mouldings can be produced simultaneously by using a hot runner manifold of the type described, for example, in U.S. Pat. No. 4,832,254. According to the invention, the underside (7) of the fixed mould half (1), which rests on the separating plane (6), has an encircling projection (5). The moulding is produced in the manner described below.

Figure 1B:
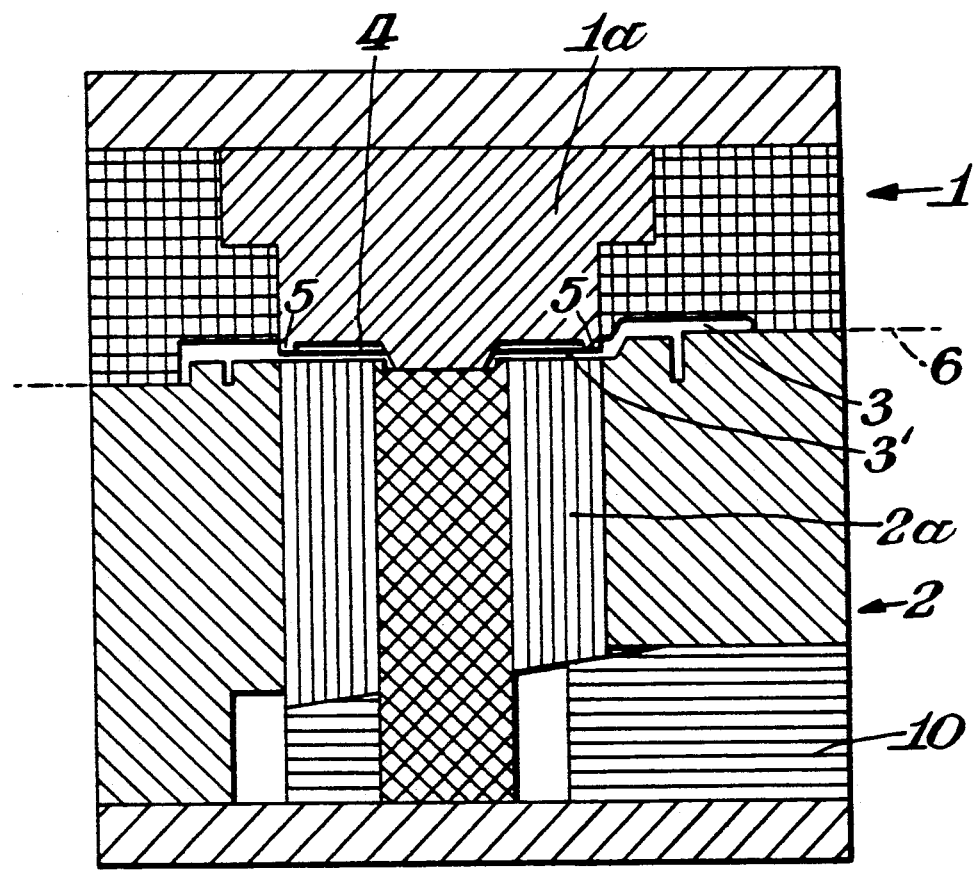
FIG. 1b shows a corresponding cross section in which the moving core is in the lower working point.

The moving core (2a) is initially in the upper working position (FIG. 1a) in which its upper side (8) abuts against the projection (5) of the fixed core (1a). In this way, this projection forms a sealing strip between the mould cavities (3, 4). The first component is now injected into the cavity (4) via an inlet point (12) (FIG. 2a) through a needle shut-off nozzle (not shown). Immediately afterwards, the core (2a) is moved downward axially (arrow) by about half the wall thickness of the magnetic tape cassette casing so that it is now arranged as in FIG. 1b. This displacement is produced by a radially movable wedge (10) of which the upper side (11) is beveled and which contacts the underside (9), which is beveled in the same direction, of the moving core (2a) and is connected thereto, for example by a double T groove. The second component is now injected into the cavity (3) and the newly formed cavity (3') via the inlet point (13) (FIG. 2b) from a needle shut-off nozzle (not shown). A two-layered structure is thus obtained in the region of the cavity (3') above the moving core (2a). After separation and ejection of the moulding, the injection moulding process is repeated for the next moulding.

The vertical range of movement of the moving mould half is, as already mentioned, generally approximately half the total thickness of the cassette casing. However, this is only a rough indication which depends on how the ratio of the layer thicknesses of the two partial layers of the injection moulding is selected.

Figure 2A:
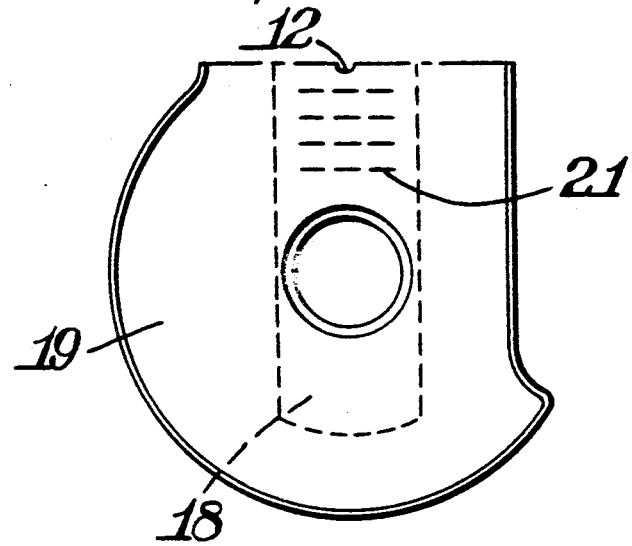
FIG. 2a shows a plan view of a part of a magnetic tape cassette casing with the first casing part component.
Figure 2B:
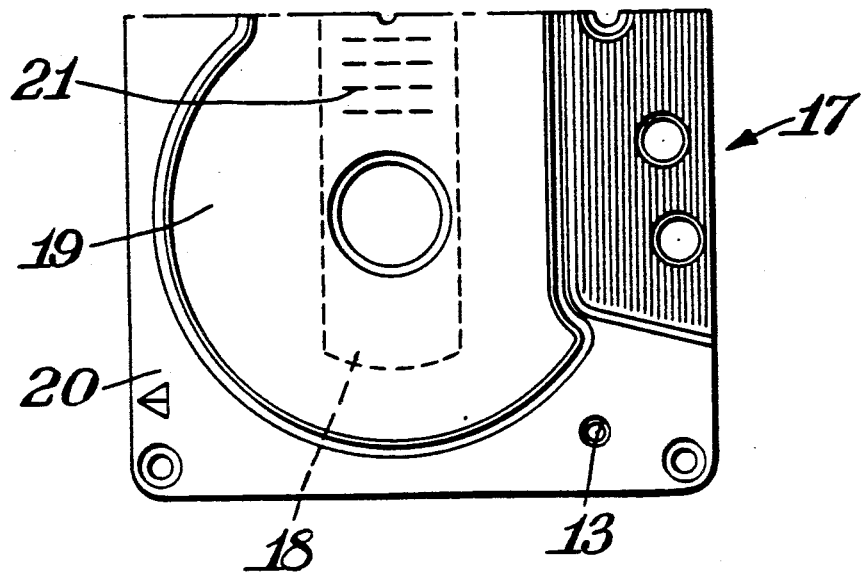
FIG. 2b shows a corresponding plan view in which the two components are poured on top of one another.

If, for example, transparent polystyrene having the technical name "PS Standard" is injected into the cavity (4) and impact polystyrene SB into which pigments, for example carbon black or coloring materials are incorporated, is injected into the cavity (3, 3'), the transparent viewing window is obtained in the region (18), the overlapping two-layered structure in the region (19) and the purely opaque part in the region (20) (FIG. 2a, 2b).

It has been found that magnetic tape cassette casings having a thickness ranging from 1 to 2 mm with good mechanical properties and a very pleasant appearance are obtained in this way. Variations are obviously also possible within the scope of this invention, for example coloring materials, for example the fluorescent coloring materials known from U.S. Pat. No. 4,650,801, can also be incorporated in the first component for the transparent part. This measure allows the marking (21) usually provided in the viewing window (FIGS. 2a, 2b) to be optically accentuated in a particular manner.

It is also possible to construct the apparatus according to the invention as a multiple tool by means of a hot runner manifold, for example according to EP 0 262 490, so that several, for example eight, cassette casings can be produced simultaneously in this way.

What is claimed is:

1. Apparatus for moulding a multi-component moulded object with at least two partially overlapping components comprising a fixed mould half having a first fixed core,
    a movable mould half having a moving core and a second fixed core,
    first and second mould cavities being formable between said fixed and movable mould halves,
    a first surface of said fixed half forming a part of said cavities,
    a second surface of said movable half forming a part of said cavities,
    a projection on said fixed half projecting from said first surface,
    wherein said moving core is axially movable between a first position in which said second surface abuts against said projection
    to form said first mould cavity,
    and a second position in which said first and second surfaces are spaced apart to form said second mould cavity,
    a first means for injecting a first plastic into said first mould cavity,
    a second means for injecting a second plastic into said second mould cavity,
    wherein said second cavity extends laterally of the mould halves beyond said first cavity, so that at least two partially overlapping components may be formed in the respective first and second cavities,
    said moving core being axially displaceable from said first position to said second position in relation to the ratio of the layer thickness of the overlapping components so as to provide a connection between the two components of the moulded object.

2. The apparatus as claimed in claim 1 in which said moving core has a beveled surface,
    and said apparatus further comprising a radially displaceable member having a surface which tapers in its axial dimension in the same direction as said beveled surface to compliment the level of the beveled surfaces,
    said displaceable member being constructed and arranged that said tapering surface engages said beveled surface upon radial displacement of said member whereby the moving core is axially displaceable.

* * * * *